United States Patent
Rotem et al.

(10) Patent No.: US 11,543,878 B2
(45) Date of Patent: Jan. 3, 2023

(54) POWER CONTROL ARBITRATION

(71) Applicant: Intel Corporation, Santa Clara, CA (US)

(72) Inventors: Efraim Rotem, Haifa (IL); Eliezer Weissmann, Haifa (IL); Eric Dehaemer, Shrewsbury, MA (US); Alexander Gendler, Kiriat Motzkin (IL); Nadav Shulman, Tel Mond (IL); Krishnakanth Sistla, Beaverton, OR (US); Nir Rosenzweig, Givat Ella (IL); Ankush Varma, Portland, OR (US); Ariel Szapiro, Tel Aviv (IL); Arye Albahari, Kiriat Motzkin (IL); Ido Melamed, Kfar-Saba (IL); Nir Misgav, Santa Clara, CA (US); Vivek Garg, Folsom, CA (US); Nimrod Angel, Haifa (IL); Adwait Purandare, Hillsboro, OR (US); Elkana Korem, Tzoran (IL)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 17/042,804

(22) PCT Filed: May 1, 2018

(86) PCT No.: PCT/US2018/030517
§ 371 (c)(1),
(2) Date: Sep. 28, 2020

(87) PCT Pub. No.: WO2019/212541
PCT Pub. Date: Nov. 7, 2019

(65) Prior Publication Data
US 2021/0018971 A1    Jan. 21, 2021

(51) Int. Cl.
*G06F 1/32* (2019.01)
*G06F 9/4401* (2018.01)
(Continued)

(52) U.S. Cl.
CPC ............ *G06F 1/329* (2013.01); *G06F 1/3206* (2013.01); *G06F 9/30098* (2013.01); *G06F 9/4401* (2013.01); *G06F 9/4881* (2013.01)

(58) Field of Classification Search
None
See application file for complete search history.

(56) References Cited

U.S. PATENT DOCUMENTS 7,017,060 B2    3/2006    Therien et al.
7,421,601 B2    9/2008    Bose et al.
(Continued)

OTHER PUBLICATIONS

International Search Report and Written Opinion dated Dec. 19, 2018 for International Application No. PCT/US2018/030517, 13 pages.
(Continued)

*Primary Examiner* — Fahmida Rahman
(74) *Attorney, Agent, or Firm* — Schwabe, Williamson & Wyatt, P.C.

(57) ABSTRACT

A local power control arbiter is provided to interface with a global power control unit of a processing platform having a plurality of processing entities. The local power control arbiter controls a local processing unit of the processing platform. The local power arbiter has an interface to receive from the global power control unit, a local performance limit allocated to the local processing unit depending on a global power control evaluation and processing circuitry to determine any change to one or more processing conditions prevailing in the local processing unit on a timescale shorter than a duration for which the local performance limit is applied to the local processing unit by the global power
(Continued)

control unit and to select a performance level for the local processing unit depending on both the local performance limit and the determined change, if any, to the prevailing processing conditions on the local processing unit.

21 Claims, 10 Drawing Sheets

(51) Int. Cl.
*G06F 1/329* (2019.01)
*G06F 1/3206* (2019.01)
*G06F 9/30* (2018.01)
*G06F 9/48* (2006.01)

(56) References Cited

U.S. PATENT DOCUMENTS

| | | |
|---|---|---|
| 9,310,867 B2 | 4/2016 | Brinks et al. |
| 2006/0069936 A1 | 3/2006 | Lint et al. |
| 2014/0237276 A1* | 8/2014 | Machnicki ............ G06F 1/3234 713/323 |
| 2016/0094350 A1* | 3/2016 | Picard ........................ G06F 1/26 713/300 |

OTHER PUBLICATIONS

International Preliminary Report on Patentability dated Nov. 12, 2020 for International Application No. PCT/US2018/030517, 10 pages.

* cited by examiner

| REGISTER | BITS | FIELD | SCOPE | ACCESS TYPE | DESCRIPTION |
|---|---|---|---|---|---|
| IO_L2G_mailbox_IF<br><br>Local power control arbiter to global power control unit mailbox | | | package | | This register together with IO_L2G_mailbox_data registers provide an interface from the local power control arbiter to the global power control unit. This allows the local arbiter code to send commands to the global power controller code. Global code writes command result on data registers and accesses these as control registers. Busy bit is set by local code and cleared by global. Code. Register writable only by global code if RUN_BUSY is set and only by hardware if RUN_BUSY is cleared. Register may be duplicated in GPSB CR SPACE |
| | [7:0] | COMMAND | | RW | 0x01=completed – the only command global code writes to register after RUN_BUSY is set indicating request completed.<br>0x10=read configuration<br>PAYLOAD={start configuration entry(9bits), number of entries (4 bits)}<br>Data is written to DATA_LOW and DATA_high including the start entry |
| | [21:8] | PAYLOAD | | RW | |
| | [29:22] | WINNING_CORE_ID | | RW | When CORE_BUSY=1 any write attempt by a core other than WINNING_CORE is to be ignored |
| | [30] | CORE_BUSY | | RW | This mailbox serves only one core at a time, the "WINNING_CORE". When the bit is zero another core can write to the register |
| | [31] | RUN_BUSY | | RW | Reset by global code and set by local code |
| | [61:32] | DATA | | RW | |
| IO_L2G_mailbox_data_low | [31:0] | DATA | package | RW | |
| IO_L2G_mailbox_data_high | [31:0] | DATA | package | RW | |

Figure 7A

| REGISTER | BITS | FIELD | SCOPE | ACCESS TYPE | DESCRIPTION |
|---|---|---|---|---|---|
| G2L_MAILBOX_INTERFACE | | | package | | This register along with G2L_maibox_data provides a mailbox interface from the global code to the local code. This mailbox allows the global code to send commands to the local code of a given core. Busy bit is set by global code and cleared by local code Register writable only by local code if RUN_BUSY is set and only by hardware if RUN_BUSY is cleared Register may be duplicated in GPSB CR SPACE |
| Global power control unit to local power control arbiter mailbox | | | | | |
| | [7:0] | command | | RW | |
| | [21:8] | payload | | RW | |
| | [30:22] | RSVD | | RW | |
| | [31] | RUN_BUSY | | RW | RUN_BUSY is reset by local code and set by global code. After setting the bit an event should be sent to the correct core (or other local unit) |
| | | | | | |
| G2L_mailbox_data_low | [31:0] | DATA | package | RW | |
| G2L_mailbox_data_high | [31:0] | DATA | package | RW | |

Figure 7B

POWER CONTROL ARBITRATION

CROSS REFERENCE TO RELATED APPLICATIONS

The present application is a national phase entry under 35 U.S.C. § 371 of International Application No. PCT/US2018/030517, filed May 1, 2018, entitled "POWER CONTROL ARBITRATION", which designated, among the various States, the United States of America. The disclosure of International Application No. PCT/US2018/030517 is hereby incorporated by reference in its entirety.

TECHNICAL FIELD

Embodiments described herein generally relate to the field of power control of processing entities of a processing platform.

BACKGROUND

Processors have dynamically changing power requirements depending on processing application (workload) demands. A number of different performance states of a processor may be implemented, for example, by selecting an execution frequency, f, and a corresponding processor core voltage, V. Processor power consumption, P, may be approximated as, $P=f*V^2*C+leakage$, where C is capacitance. The leakage is approximately a constant corresponding to power wasted as a result of applying a voltage to a transistor. Thus, the processor frequency and voltage may be increased when processing workload is high to run faster and this results in increased power consumption, whilst processor frequency and voltage may be reduced when the processor has a low workload or is idle to reduce power consumption.

On current processing platforms, active power management may be performed by dynamically scaling at least one of voltage and frequency, a technique known as Dynamic Voltage and Frequency Scaling (DVFS). The DVFS may be performed when processors demand higher (or lower) performance states and may be based on changes in processor utilization. Higher performance states (higher frequency states) are often granted by a DVFS controller unless there is some other constraint or limit that mitigates against the higher frequency choice, such as detection of thermal violations or peak current violations during processing. Operating at higher frequencies may not guarantee better processing throughput because processing conditions such as memory-dependent stalls may limit throughput. Monitoring of changes in processor utilization by DVFS algorithms may be performed at regular intervals, for example on millisecond timescales. An individual processor core may perform power governance on these timescales and other processing units on the same processing platform, such as one provided on a System on Chip (SoC), may send frequency requests to a global power governance algorithm. Where two or more processing entities are provided on the same processing platform, the DVFS algorithm may sequentially service performance level requests from different processing entities and allocate appropriate operating frequencies.

BRIEF DESCRIPTION OF THE DRAWINGS

Embodiments described herein are illustrated by way of example, and not by way of limitation, in the figures of the accompanying drawings in which like reference numerals refer to similar elements:

FIG. 7A schematically illustrates a register layout of a Local to Global (L2G) mailbox;

FIG. 7B schematically illustrates a register layout in the global power control unit of a Global to Local (G to L) mailbox;

DESCRIPTION OF EMBODIMENTS

Illustrative embodiments of the present disclosure include, but are not limited to, methods, systems and apparatuses and machine-readable instructions for peak power determination in processing units.

Figure 1:
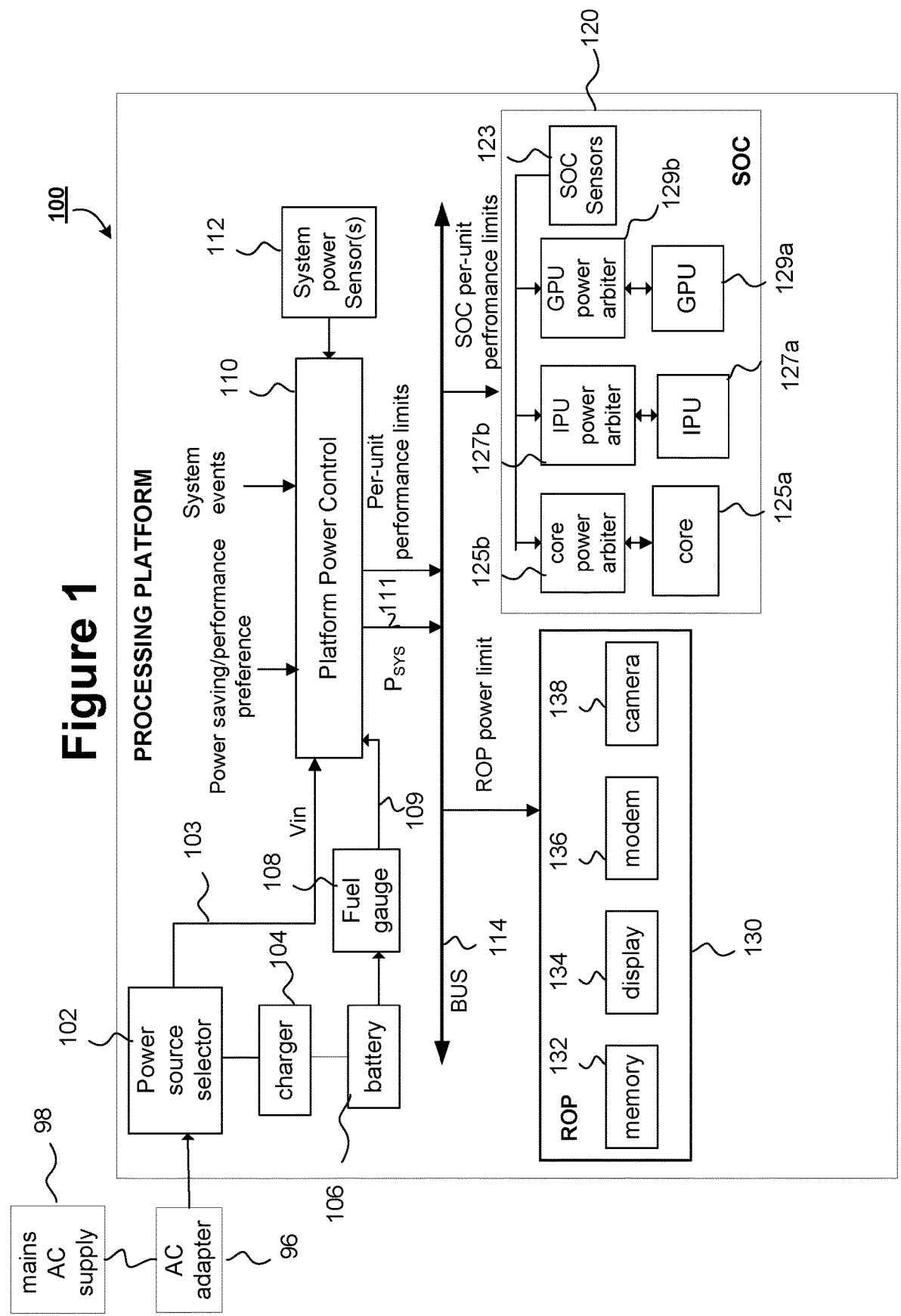
FIG. 1 schematically illustrates a processing platform having a platform-level power control unit and a plurality of SOC-level power control arbiters to arbitrate performance levels.

FIG. 1 schematically illustrates a processing platform 100 having a platform-level power control unit 110 and a plurality of SOC-level power control arbiters 125b, 127b, 129b to arbitrate performance levels, such as an operating frequency, for one or more individual processing entities of a SOC 120, which implements global power control in the FIG. 1 example. The processing platform 100 comprises a power source selector 102, a charger 104, a battery 106, a fuel gauge 108, the platform-level power control circuitry 110 and one or more system power sensors 112. A system bus 114 provides a communication path between the platform-level power control unit 110 and the SOC 120 and a Rest-of-Platform (ROP) 130 representing a set of system components other than the SOC 120 to which the platform-level power control unit 110 controls power from an available power supply.

The ROP 130 in this example comprises a memory 132, a display 134, a modem 136 and a camera 138. The SOC 120 comprises: a platform-wide power control unit 122; one or more SOC based sensors 12; a SOC bus 124; a processing core 125a and a corresponding core power arbiter 125b; an Image Processing Unit (IPU) 127a and a corresponding IPU power arbiter 127b; and a Graphics Processing Unit (GPU) 129a and a corresponding GPU power arbiter 129b. the platform-wide power control unit 110 is an example of a global power control unit whereas each of the core power arbiter 125b, the IPU power arbiter 127b and the GPU power arbiter 129b is an example of a local power control arbiter according to the present technique. The cooperative performance level control implemented by the global power control unit and the local power control arbiter(s) allows more autonomy for the processing units 125a, 127a, 129a to change performance levels to be responsive to prevailing processing conditions on shorter timescales that would be possible by relying on a frequency allocation from the platform-wide power control unit 110 alone.

Rather than simply receiving and implementing an operating frequency from the platform-wide power control unit 110, according to the present technique each processing unit 125a, 127a, 129a receives from the platform-wide power control unit 110 a performance level limit such as, for example, a frequency ceiling, a voltage ceiling, a power limit. The core power arbiter 125b, the IPU power arbiter 127b and the GPU power arbiter 129b may use these performance level limits, which may differ for the different processing entities, as constraints and yet may implement changes in operating frequency and voltage on shorter timescales than would be possible without the local power arbitration. For example, the core power arbiter 125b may implement an algorithm on the core 125a to optimize or at least improve processing performance or power consumption using information that is accessible locally in the core 125a such as whether single-threaded or multi-threaded processing is being performed by the core 125a in a given time window or by measuring a dynamic capacitance, Cdyn, of the core 125a which is workload dependent and thus varies with processor load. For example, Cdyn may be determined from the equation $P=C*V^2*f$ once the power drawn by the core 125a has been measured by one of the SOC sensors.

The IPU 127a may be an imaging subsystem to process camera images from a camera integral to an electronic device. The IPU 127a may comprise a sensor and camera control chipset and an image signal processor. The IPU 127a may support image capture, video capture, face detection and image processing capabilities.

The GPU 129a is a specialized highly parallel processing unit that uses a frame buffer and memory manipulation to process blocks of data to accelerate computer graphics and image processing. The GPU 129a may comprise a plurality of execution units (EUs), each comprising at least one floating point unit (FPU).

The power source selector 102 may select an AC adapter 96 that performs Alternating Current (AC) to Direct Current (DC) conversion on power from a mains AC supply 96 to supply power to the processing platform 100. However, when mains power is unavailable, the power source selector 102 may select the battery 106 of the processing platform 100 to supply power to the SOC 120 and the ROP 130. If the battery 106 is not fully charged then the AC adapter may be controlled by the power source selector 102 to supply power to increase a charge level of the battery 106 as well as supplying power to the SOC 130 and the ROP 130.

The fuel gauge 108 may be used to determine at least a battery power and a battery current, for example, by using a coulomb gauge or a sense resistor to monitor a total quantity of charge either supplied to the battery in a charge cycle or received from the battery in a discharge cycle. The fuel gauge 108 may provide an indication of at least one of a battery charge level and a full battery capacity in dimensioned units such as Coulombs or Ampere hours. The full battery capacity may decline in value over a battery lifetime due to effects of multiple charge-discharge cycles. The fuel gauge may thus provide an indication of a peak power capacity of the battery 106 at a given time, which may depend on calibration of the battery and a battery charge level at the given time.

The platform-wide power control unit 110 may be coupled to the one or more system sensors 112 to receive information indicating a status of the one or more sensors 112. The sensors 112 may be provided proximate to components of the system such as proximate to the battery 106 or power source selector 102 or proximate to interconnections such as the bus 114 or any other component associated with the processing platform 100. The SOC sensors 123 may be provided proximate to one or more of the core 125a, the IPU 127a, the GPU 129a and the bus 124. The sensors 112, 123 may provide measurements of, for example, battery charge levels, battery current values, adapter current values, temperature, operating voltage, operating current, operating power, inter-core communication activity, operating frequency or any other parameter relevant to power or thermal management of the processing platform 100.

The SOC 120 of FIG. 1 may receive a system power signal, $P_{SYS}$, 111 from the platform-level power control unit 110 via the system bus 114 and may use the $P_{SYS}$ signal 111 to monitor when the system power satisfies one or more threshold conditions including a peak power threshold condition. The threshold conditions may relate to average power limits or to instantaneous power limits of the processing platform 100. The threshold conditions may relate to a minimum voltage value for $V_{SYS}$ below which system failure is likely to occur or to a maximum value of $P_{SYS}$ (or corresponding maximum current $I_{SYS}$ or voltage $V_{SYS}$), above which system failure is likely to occur. A threshold voltage $V_{TH}$ and the maximum permissible system power $P_{MAX\_SYS}$ and maximum permissible system current $I_{MAX}$ or voltage $V_{MAX}$ for the SOC may be set, for example by software in the SOC based on information from the platform-level power control unit 110. In other examples, these power limit parameters for the SOC 120 may be set by an embedded controller (not shown) on the processing platform. Furthermore, according to the present technique, the global power control unit 110 may allocate a ceiling frequency or ceiling voltage or ceiling power allocation or a combination of two or more ceiling values to one or more of the core 125a, IPU 127a and the GPU 129a.

Triggering of assertion of a throttling signal to prevent system failure by upper thresholds being breached may depend on one or more of the values $V_{TH}$, $I_{MAX}$ and $P_{SYS\_MAX}$. The throttling signal may activate a power reducing feature of the SoC to reduce a processor frequency within a predictable time window $\Delta t_1$ of the throttling signal being asserted. The power reducing feature in some examples is implemented by the global power governance circuitry 110 either reactively to respond to a threshold being crossed or preemptively to prevent a threshold being crossed. Some power thresholds may relate to average power indicators whereas other power thresholds may relate to instantaneous power characteristics associated with "spikes" in processing activity. According to the present technique, a subset of power reducing features such as certain power thresholds may be implemented locally by the local power control arbiters 125b, 127b, 129b and spikes in processing activity may be resolved at a higher resolution (on shorter timescales) due to provision of local power control arbitration hardware and software.

Further power control signals may be sent via the system bus 114 depending, for example, on thermal limits of the processing units based on feedback from at least one of the system sensors 112 and the SOC sensors 123. For example, the SOC sensors 123 may feedback temperature and power consumption measurements from the processing units 125a, 127a, 129a to the platform-wide power control circuit 110 via the bus 114.

The platform-wide power control unit 110 may deal with thresholds applicable to the platform as a whole, including the SOC 122 and the ROP 130. For example, the platform-wide power control unit 110 may ensure that a total power drawn by the ROP 130 and the SOC 120 does not exceed a maximum system power $P_{SYS}$ currently available from the selected power source. The maximum power available may change, for example, as the charge level of the battery 106 depletes. The platform-wide power control unit 110 may receive an input voltage 103 from the power source selector, an indication of a battery charge level via a signal 109 from the fuel gauge 108, an indication of a user preference denoted an EPP (Energy Performance Preference) indicating if a power saving mode or a performance enhancing mode is currently selected and an indication of system events such as docking and undocking of the processing platform 100 from a docking station that connects it to the mains AC supply 98. The EPP may be provided by an operating system or may be a user-programmable value. The platform-wide power control unit 110 may determine one or more performance limit for each processing entity. The performance limit may be, for example a frequency limit, a voltage limit a current limit or a power limit. The performance limit(s) may include at least one of upper limits and lower limits for a given processing entity.

In some embodiments, the processing platform 100 may comprise only the SOC 120 and no ROP 130 components. As well as controlling power drawn by platform components so that it does not exceed $P_{SYS}$, the platform-wide power control unit 110 may ensure proper thermal management of the processing platform 100 to maintain conformity with any power dissipation and junction temperature operating condition limits associated with processing units such as the core 125a. Operating the core 125a within thermal and any other design limits can prevent inadvertent damage to the core 125a and other components of the platform 100. At least one of the platform power-wide power control unit 110 and the local power control arbiters 125b, 127b, 129b may implement one or more power limits, such as a first power limit, PL1, providing a threshold for average power of the platform 100 that may be sustainable indefinitely. The value of PL1 may be set at or close to thermal design limits of the processing platform.

A number of different performance parameters may be used to monitor performance of a processing entity. For example, a "utilization" of a processing unit may refer to a proportion of the total available processing cycles when a processor (which may comprise multiple physical cores) is in an active state rather than in a sleep state, a power saving mode or in an off state. The utilization is sometimes denoted "load", although this "load" is different from a workload (a processing task comprising instructions to execute). A workload, upon execution by a given processor may result in a corresponding utilization of the processor and a corresponding scalability (as defined below). Instantaneous measurements of utilization and scalability of a given workload may vary during the execution time. In a sleep state, power consumption is reduced by suspending processing but retaining some power so that "wake-up" is more rapid than it would be from a power of state.

A processor may provide a number of different power states even in an active mode, but an active state refers to the processor state being fully on and the system clocks being on. The active state is a normal state of a physical core when code is being executed. For multi-threaded operation, if any thread in a processor core is active then the state of the core may be resolved to be active. In "sleep" states the processor state is not fully on, but the system clocks are on. Processor performance levels may be controlled via an operating system or via dedicated or special purpose hardware or using a combination of hardware and software. The platform-wide power control unit 110 may take into account one or more of: processing workload demand (for example, a type of program application being executed), thermal limits of processing hardware, maximum power, voltage, frequency and current levels and an activity window of performance requested by an operating system.

The "scalability" of a processing unit may refer to how an execution time of a given processing workload of a processing unit may change with the operating frequency. A workload resulting in many stalls, for example, may be less scalable than a workload resulting in few stalls. The stalls may occur, for example, due to a dependency on data being returned from memory. Thus the utilization may provide a measure of when a processor is active, whereas scalability may provide a measure of useful (stall-free) work done when the processor is active. It will be appreciated that increasing a processing frequency when scalability is low is likely to result in less of an increase in the rate of workload throughput than when the scalability is high. This is because stalls such as memory-dependent stalls are not ameliorated by increasing the frequency of the processing unit because the stall time is not an explicit function of the processing unit execution clock rate.

In previously known systems, selection of performance levels (e.g. operating frequency) of processing units were performed by the platform-wide power control unit 110 or some other global power control unit based on system power thresholds and may have taken into account processing entity utilization and scalability in order to dispense a new frequency for a processing unit 125a, 127a, 129a when selecting a new performance level.

By way of contrast, according to the present technique there is the possibility of individual processing units 125a, 127a, 129a having some autonomy in selecting an operating frequency based on locally monitored processing conditions. The platform-wide power control unit in this example sets an upper limit to a processing unit operating frequency or operating voltage rather than directly setting the operating frequency or voltage. The actual operating frequency or voltage may then be set autonomously locally at the processing unit by the respective local power control arbiter 125b, 127b, 129b by monitoring local processing conditions and selecting one of a plurality of performance levels without exceeding the globally set limits. The global frequency limit may be updated on a first timescale whereas the local operating frequency updating may be performed on a second timescale, shorter than the first timescale to give more fine-grained control.

Some processing units may have more than one associated frequency of operation influencing a performance level of the unit. For example, the IPU 127a may have an input subsystem frequency and a processing subsystem frequency, which may be separately controlled. Instead of a single core 125, the SOC may comprise a multi-core processor having a plurality of physical cores.

In a multi-core processor, all active processor cores may share the same frequency and voltage by selecting, for example, a highest frequency performance state requested amongst all of the active cores as the frequency to allocate.

Figure 3:
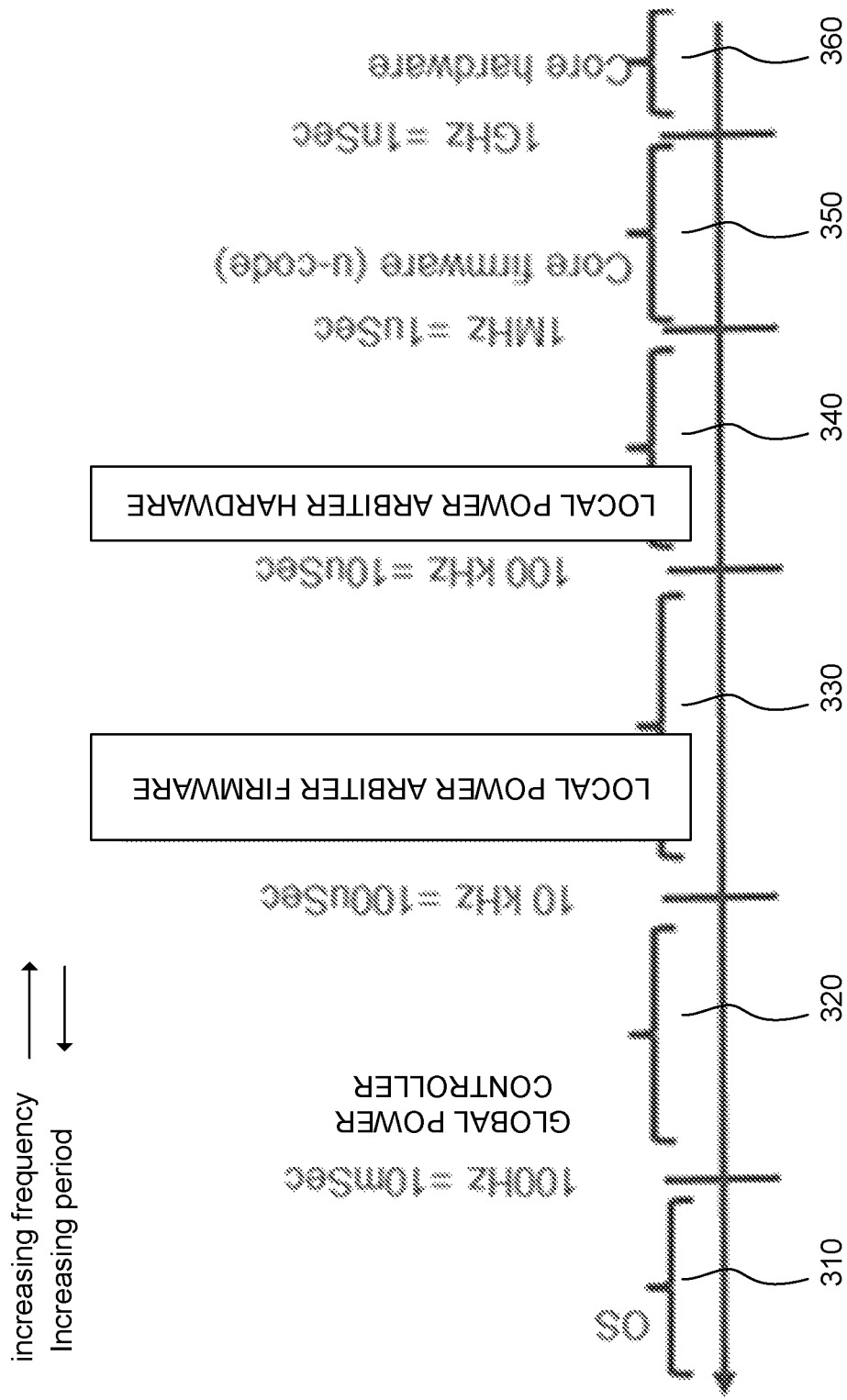
FIG. 3 schematically illustrates different bandwidths of event frequencies and corresponding performance control management entities for those bandwidths.

The core 125a may have multiple performance operating points having associated frequency and voltage parameters. An operating point may be selected to prioritize power efficiency or performance depending on a value of the EPP parameter. Frequency selection may be software controlled by writing to one or more CPU registers. An operating voltage may then be selected, in the case of the core 125a, depending on the selected frequency. Due to a low transition latency between performance states, the global power control unit 110 may be able to implement multiple performance level transitions per second (e.g. update frequency of between 10 milliseconds and 100 µs as shown in FIG. 3) for each processing unit 125a, 127a, 129a.

The GPU 129 may have a driver to dynamically adjust between performance states to maintain performance, power and thermal constraints. The voltage of the GPU 129a may be adjusted down to place it in a sleep state. A frame-rate may be limited to reduce a load on the GPU 129a and allow it to be run at lower speeds to make power savings. Thus the GPU 129 may be controlled by the platform-wide power control unit 122 in cooperation with the GPU power control arbiter 129b to operate within a frequency or voltage or current limit depending on an available system power $P_{SYS}$.

In some previously known systems, allocation of an operating frequency to the core 125a may have been controlled according to a DVFS algorithm arranged to monitor processor core utilization and scalability at regular intervals, for example, around every millisecond and to apply averaging to the measured quantities. Any other DVFS capable platform components such as the IPU 127a and GPU 129a may have sent their frequency requests to the global power governance algorithm of the platform-wide power control unit 122. Similarly, for a multi-core processor, each of the plurality of cores may have sent a respective frequency request to the platform-wide power control unit 122 to increase throughput or to conserve power, for example. A highest requested frequency amongst those requested by the plurality may have been selected, which could result in power expenditure without performance gain for at least those cores that requested lower operating frequencies.

Processing units 127a 129a other than a CPU tend not to perform power-aware governance for the respective processing unit although a frequency request could be made. In previously known systems there has been a strong focus on extracting the best performance without close consideration of the power impact of performance-based tuning. An operating frequency for the core 125a may have been selected based on observed changes in utilization and scalability. A performance state may have been determined using a ratio of core 125a power to system power $P_{SYS}$, but also by considering power from all platform components other than the core 125a as a static SOC power. A high frequency performance level or boosted performance level known as a "turbo frequency" may have been allocated depending on a utilization threshold being exceeded. The system may have responded reactively to higher than desirable power consumption corresponding to, for example, a thermal warning being triggered or a peak current violation, to reactively reduce power consumption by decreasing operating frequencies of processing units to reduce the power consumption to a desirable level.

In such previously known systems, a power governor algorithm for the core 125a may have been a centralized arbiter and controller for granting frequency to other processing units such as the IPU 127a and the GPU 129a. By way of contrast, according to the present technique, each DVFS capable processing unit 125a, 127a, 129a may have a unit-specific algorithm to perform power control to enable autonomous, but upper-limit constrained frequency allocation of the respective unit. Distributing some performance level selection ability between two or more power controllers such as the global power controller and one or more of the local power control arbiters 125b, 127b, 129b is more scalable to different platform architectures than the previously known central (global) power governance approaches. The autonomous local performance level selection of example embodiments allows performance level preferences that distinguish between power efficiency and performance enhancement to be input to each processing unit 125a, 127a, 129a, rather than just to the core 125. Furthermore, thermal limits and ceiling current, ceiling frequency, ceiling voltage and power consumption limits can be provided to the power control arbiter 125b, 127b, 129b for each processing unit and these limits can be updated on a first timescale. These upper limits to processing performance parameters may then be implemented locally as frequency selection constraints at the corresponding local processing units until they are updated, but the local processing units 125a, 127a, 129a have the autonomy to select an actual operating frequency and voltage on a second timescale, shorter than the first timescale to take into account finer-grain changes to processing conditions. Use of this semi-autonomous frequency selection by local power control arbiters 125b 127b, 129b can be used to fine tune at least one of performance and power consumption. It has been shown that this new approach of cooperation between a global and a local power control unit in setting operating frequencies of processing units such as processor cores can:

- improve performance in client and server embodiments by around 10% in some examples;
- boost performance relative to previously known systems by fine-grain clipping of maximum operating current, ICCmax, violations allowing higher frequencies to be reached;
- Improve Fully Integrated Voltage Regulator (FIVR) efficiency by more fine grained management of phases, which may provide at least a 2-6% core power reduction and may give a corresponding performance gain in power-limited scenarios;
- Enable a faster intelligent frequency switch in individual processing units providing, for example, around at least 10% performance improvement for workloads having mixed instruction width.

Figure 2:
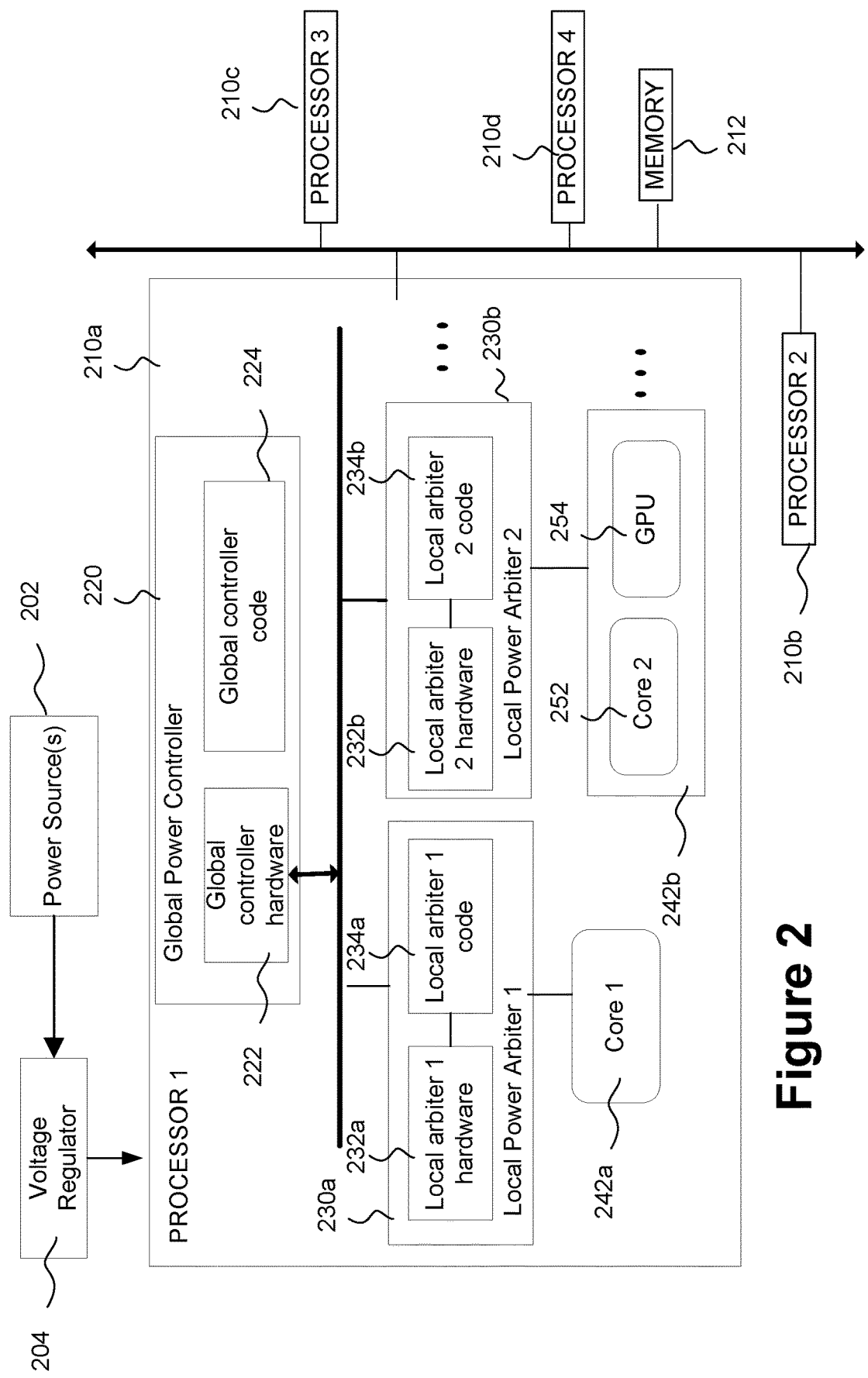
FIG. 2 schematically illustrates a processing platform having both global and local performance control of processing entities.

FIG. 2 schematically illustrates a processing platform 200 having hierarchical power management comprising both local power management of processing entities and global power management and showing the global power controller and local power arbiters in more detail than the FIG. 1 embodiment. The processing platform 200 has a plurality of processors comprising a first processor 210a, a second processor 210b, a third processor 210c and a fourth processor 210d all connected to a system bus 211. Also connected to the bus 211 is a memory 212. A single power source 202 and voltage regulator 204 are shown in FIG. 2, but additional power sources and voltage regulators may be provided.

The voltage regulator 204 may be connected to processing cores or processors via a single power plane or via multiple power planes.

A global power control unit 220 may be provided in the first processor 210a in the FIG. 2 embodiment, which differs from the FIG. 1 arrangement that shows a global power control unit 110 that is platform-wide rather than processor specific. Embodiments are not limited to either the FIG. 1 or the FIG. 2 configuration for the global power control unit, which could instead be coupled to or incorporated in the voltage regulator, the power source, any other processing platform entity. The ability to set performance level limits using a global power controller and to perform shorter-timescale performance level selection at a more local level within the constraints of one or more global limit provides for more effective and efficient dynamic voltage and frequency scaling. The global power control unit 220 has global controller hardware 222 and global controller code 224 comprising machine-readable instructions which may be provided as firmware in non-volatile memory.

The first processor 210a further comprises a first local power arbiter 230a having local arbiter hardware 232a and corresponding first local arbiter code 232b. The first local arbiter code 232b comprises machine-readable program instructions that may be provided as firmware. The first local arbiter 232a is arranged to set an operating frequency of a first processor core 242a. A second local power arbiter 230b of the first processor 210a has second local arbiter hardware 232b and second local arbiter code 234b and is arranged to set operating frequencies of two distinct processing units comprising a second core 252 and a GPU 254. For the second local arbiter 230, the global power control unit 220 is to set a frequency limit collectively for both of the second core 252 and the GPU 254 and the second local arbiter 230b has the autonomy to set an actual operating frequency common to both the second core 252 and the GPU 254 but less than or equal to the globally set limit. The second local arbiter 230b may alternatively set different frequencies for each of the second core 252 and the GPU 254. A bus 215 within the first processor 210a connects the global power control unit 220 and each of the first local power arbiter 230a and the second local power arbiter 230b.

The local performance limits supplied by the global power control unit 220 to the first local power arbiter 230a and the second local power arbiter 230b may updated periodically or intermittently, but on a coarser timescale than performance level management of the local processing unit performed by either of the local power control arbiters 230a, 230b.

Figure 6:
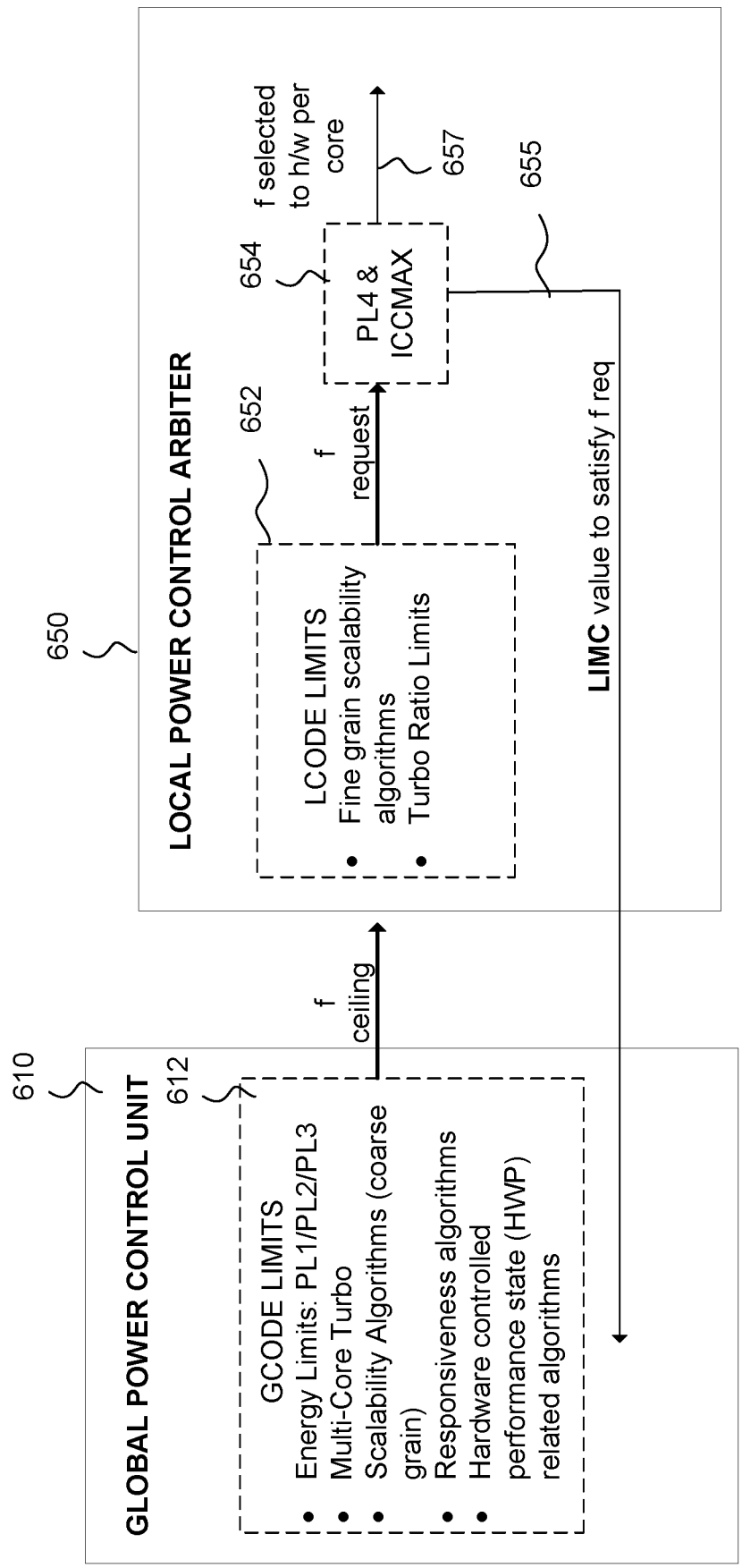
FIG. 6 schematically illustrates how different work point limits and algorithms can be subdivided between a global power control unit and a local power control arbiter.

As illustrated in more detail by FIG. 6, different limits may be monitored by the local power control arbiters 230a, 230b relative to the limits monitored by the global power control unit 220, but scalability algorithms may be run to resolve shorter timescales on the local power control arbiters 230a, 230b relative to scalability algorithms run on the global power control unit 220. Different implementations may use different time partitions locally and globally. Some limits may remain implemented by the global power control unit 220, such as limits that refer to multiple cores in embodiments where the local power control arbiter serves a single core or a smaller subset of cores than a full complement. The local power control arbiters 230a, 230b may implement an ICCmax limitation, which is a maximum current permitted to be drawn by a given set of circuitry when working at 100% utilization. Delegation of responsibility for monitoring different processing parameters and implementing different limits may be configured as required between the global power control unit 220 and the local power control arbiters 230a, 230b such that if performance or power-efficiency can be improved by a different allocation of responsibility then that configuration may be implemented.

The local arbiter hardware 232a, 234b applies an appropriate performance level to the corresponding local processing unit and updates the local performance level when processing conditions change as well as communicating at a slower rate with the global power control unit 220. The second arbiter hardware 232b may receive from the GPU 254, a request for an adjustment to its performance level. The second local arbiter code 234b may then send an acknowledgement signal to the second arbiter hardware 232b to ack receipt of the GPU request and then relay the GPU request to the global power controller 220 to determine an appropriate global response to the change request in terms of setting performance level limits for all three platform processing entities 242a, 252, 254. The global power controller 220 may then send a response regarding appropriate performance level limits back to the second local arbiter code 234b, which may then be implemented as a limit by the second local arbiter hardware 323b, although the updating of the performance level limit is performed less regularly than updates to the operating frequency and voltage implemented locally. The local power control arbiter 230b may select from a number of predetermined performance levels, such as entries of a locally populated frequency and voltage table specific to the GPU 254, in response to the request from the GPU 254 and the second local arbiter hardware 232b has the ability to respond more rapidly to the GPU request than would be possible using the global power controller 220 alone, because there could be contention for access to the global controller from other platform components such as the first core 242a. This provides for adaptability to any changes to local processing characteristics on a shorter timescale that would be possible by the processing entity communicating directly, without intermediary, with the global power control unit 220. According to this embodiment, the local power controller 230b relays a GPU 254 performance level change request to the global power controller 220 via the local power arbiter 230b the request may be first received from the GPU 254 by the second local arbiter hardware 232b and forwarded within the local power control arbiter 230b to the second local arbiter code 234b before being communicated to the global power controller 220.

In contrast with previously known systems that have only a global power control unit such as 220 to serially service individual performance change requests from different ones of a plurality of processing entities, according to the present technique, a plurality of local power control arbiters 230a, 230b are provided for a respective plurality of local processing units 242a, 242b (each comprising one or more processing entities) and each of the local processing units may communicate with the global power control unit 220 on behalf of the corresponding processing entities 242a, 252, 254. As illustrated in more detail in FIG. 4, mailboxes enabling commands to be sent between the first local arbiter code 234a and the global controller code 224 and likewise between the second local arbiter code 234b and the global controller code 224 may be provided. A contention-based access to the global controller code 224 may be implemented for the first local arbiter code 234a and the second local arbiter code 234b. However, performance change requests from the first core 242a to the first local power arbiter 230a and from the second core 252 and the GPU 254 to the second local arbiter code may be serviced more rapidly due to reduced or no contention. Thus provision of the local power control arbiters 230a, 230b ameliorates a communication bottleneck that may otherwise occur as a result of contention by two or more local processing units 242a, 242b when requesting computational resources such as increased processing performance from the global power control unit 220.

FIG. 3 schematically illustrates different bandwidths of event frequencies and corresponding performance control management entities for those bandwidths. Starting from the lowest frequency end of the axis on the left-hand side of FIG. 3, a first bandwidth 310 extends from 0 up to 100 Hz 10 ms resolution or longer) which may be managed by an operating system which may, for example, control power in this bandwidth by transitioning an individual processor core between one or more sleep states and an active state depending on workload demands. A second bandwidth 320 corresponds to 100 Hz to 10 KHz (10 ms to 10 µs resolution) and frequency transitions in this bandwidth may be managed by program code of a platform-wide (global) power control unit, as of a type previously known. The global power control unit software is denoted "p-code" in FIG. 3, but may alternatively be referred to in this description as "Gcode" as an abbreviation for Global code. A third bandwidth 330 corresponds to a frequency range of 10 to 100 kHz (100 µs to 10 µs resolution) and this may be managed by local power management firmware or equivalently program code, denoted "a-code" or "Lcode" (as an abbreviation for local code) running on local power control arbiter hardware according to the present technique. A fourth bandwidth 340 corresponds to a frequency range of 100 kHz to 1 MHz (10 µs to 1 µs resolution) and this fourth bandwidth may be managed by local power arbiter hardware according to the present technique. A fifth bandwidth 350 corresponds to a frequency range of 1 MHz to 1 GHz (1 µs to 1 ns) and may be managed by core firmware or equivalently "u-code". A sixth bandwidth 360 corresponds to a frequency range of above 1 GHz (1 ns and shorter) and may be managed by core hardware.

Example embodiments address a shortfall of previously known techniques whereby the combined frequency range of the third and fourth bandwidths 230, 240 spanning from 10 kHz to 1 MHz (100 µs to 1 µs) had no effective means of power management control at that level of granularity. Thus, provision of one or more local power arbiters in addition to the global power control unit closes the gap in event switching frequency and allows performance level selection to take into account events in the 10 kHz to 1 MHz frequency range and thus improves overall efficiency and effectiveness of power management.

Figure 4:
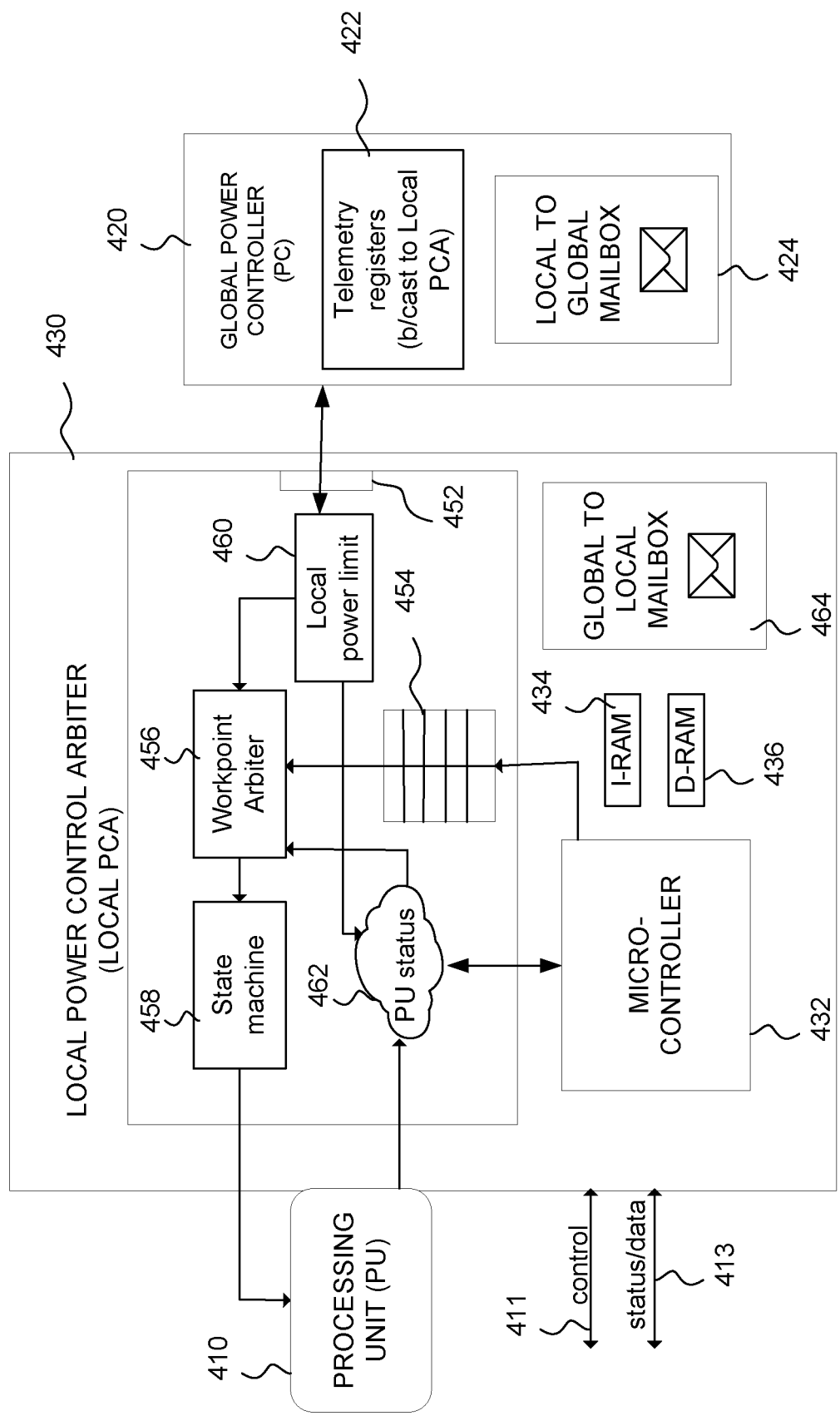
FIG. 4 schematically illustrates components and functionality of the local power control arbiter 430 in more detail than was shown in FIG. 1 or FIG. 2.

FIG. 4 schematically illustrates a processing unit 410 and a local power control arbiter 430 having an interface 452 with a global power controller 420. FIG. 4 shows components and functionality of the local power control arbiter 430 in more detail than was shown in FIG. 1 or FIG. 2. The local power control arbiter 430 comprises a microcontroller 432, an instruction random access memory (I-RAM) 434, a data random access memory (D-RAM) 436 and a set of work point registers 454. Lcode (not shown) corresponding to the local power control arbiter executes on the integrated microcontroller 432 and implements control of work point setting on the processing unit via a work point arbiter 456 and a state machine 458, depending on a local performance limit received from the global power controller 420 via the interface 452. A work point may be, for example a frequency and a voltage setting for a processing entity.

A local to global (L2G) mailbox 424 is provided as part of the global power controller 420 and a global to local (G2L) mailbox 464 is provided as part of the local power control arbiter 430 to enable communication of information between the local power control arbiter 430 and the global power controller 424. The L2G mailbox 424 is illustrated in more detail in FIG. 7A and it allows the Lcode to send commands to the Gcode, subject to a given local power control arbiter gaining control of the L2G mailbox 424, which only serves one core (or other processing unit) at a time. The G2L mailbox 464, which allows the Gcode to send commands to the Lcode of a given core at any one time, is illustrated in more detail in FIG. 7B. The global power controller 420 also has a set of telemetry registers 422 to broadcast information to the local power control arbiter 430.

Control information 411 and status information 413 and other data may be communicated between the processing unit 410 and the local power control arbiter 430 as shown.

The work point arbiter 456 receives the local performance limit 460 currently set by the global power controller 420 and also receives processing unit status information 462 regarding, for example, one or more of a workload, a scalability value, a number of currently executing threads, a dynamic capacitance estimate, a power being drawn, a current being drawn, a voltage measurement and a temperature. In some embodiments the local performance limit is an upper frequency limit, but is not limited to this and the local performance limit 460 may be, for example, a maximum voltage, a minimum voltage, a minimum frequency or a power limit or a combination of different limits. The microcontroller 432 may execute Lcode instructions from the I-RAM to determine, for example, a fine-grained scalability of a workload or a number of threads currently executing on a processor core. The microcontroller 432 outputs results of its workload analysis to the work point registers 454 such that a predetermined set of operating frequencies and corresponding voltage settings are selectable by the work point arbiter depending on the local performance limit 460. Thus, the local power control arbiter 430 may transition the processing unit 410 between a plurality of different states, each state having a different operating frequency and operating voltage, using the state machine 458 and depending on selection of operating parameters based on local algorithmic analysis by the Lcode executing on the microcontroller 432n the work point register 454. A lookup table of frequencies and voltages may be used by the Lcode to make an operating point selection. The work point arbiter 456 prevents selection of an operating frequency inconsistent with the local performance limit 460 set by the global power controller 420. The microcontroller 432 may in some embodiments adjust and/or control throttling intervals related to compliance with one or more power limits for the processing unit 410.

The Lcode executing on the microcontroller 432 may use a respective predicted unit-specific power profile for the particular processing unit 410, which may be a processing core, multi-core processor, GPU or IPU. The Lcode may receive or determine a unit-specific scalability value and a unit-specific utilization value. The power profile may provide a relationship between frequency, utilization and power consumption.

One or more hardware counters (not shown) may be used to determine these values for the processing unit 410 based on prevailing processing conditions. For example, a first counter may provide a reference clock to count at a fixed rate only when at least one processing core of the processing unit 410 is active; a second counter may count at an actual clock rate when a processing unit is in an active state, noting that the clock rate may vary with time due to performance level shifts; a third counter may count an actual clock rate when a processing unit is active but capable of suppressing the count when the processing unit stalls die to some dependency such as a processor core being gated base on a clock of a memory.

The processing unit 410 may have an "a priori" relationship between utilization, frequency and power. Power profiles for the processing unit 410 may be obtained based on a pre-silicon model or based on post-silicon measured data or based on synthetic workloads. A pre-silicon model may be a pre-fabrication or processor design-simulation based model. The power profile for a given processing unit may be generated in any one of a number of different ways, but however generated, the predicted power profile may used in some embodiments to generate the following processing unit governance equations:

1) power as a function of frequency and utilization,
2) frequency as a function of utilization and power and
3) utilization as a function of power and frequency In some embodiments, power expenditure of the individual processing unit 410 is not specifically taken into account prior to the local power control arbiter 430 allocating an operating frequency, but instead a simple determination such as more or less throughput required is used to select an appropriate frequency for the prevailing workload that meets a constraint such as a maximum frequency set by the global power controller. Thus frequency0voltage curves may be used instead of or in addition to power profiles.

In selecting a current operating state, the state machine 458 may take into account (i) system level inputs; (ii) utilization inputs specific to the processing unit 410; and (iii) scalability inputs specific to the processing unit 410. The system level inputs may comprise power limits (average or threshold), an upper frequency limit, a lower frequency limit, a maximum operating current, thermal limits and energy performance preference information provided by the global power controller 420.

Figure 5:
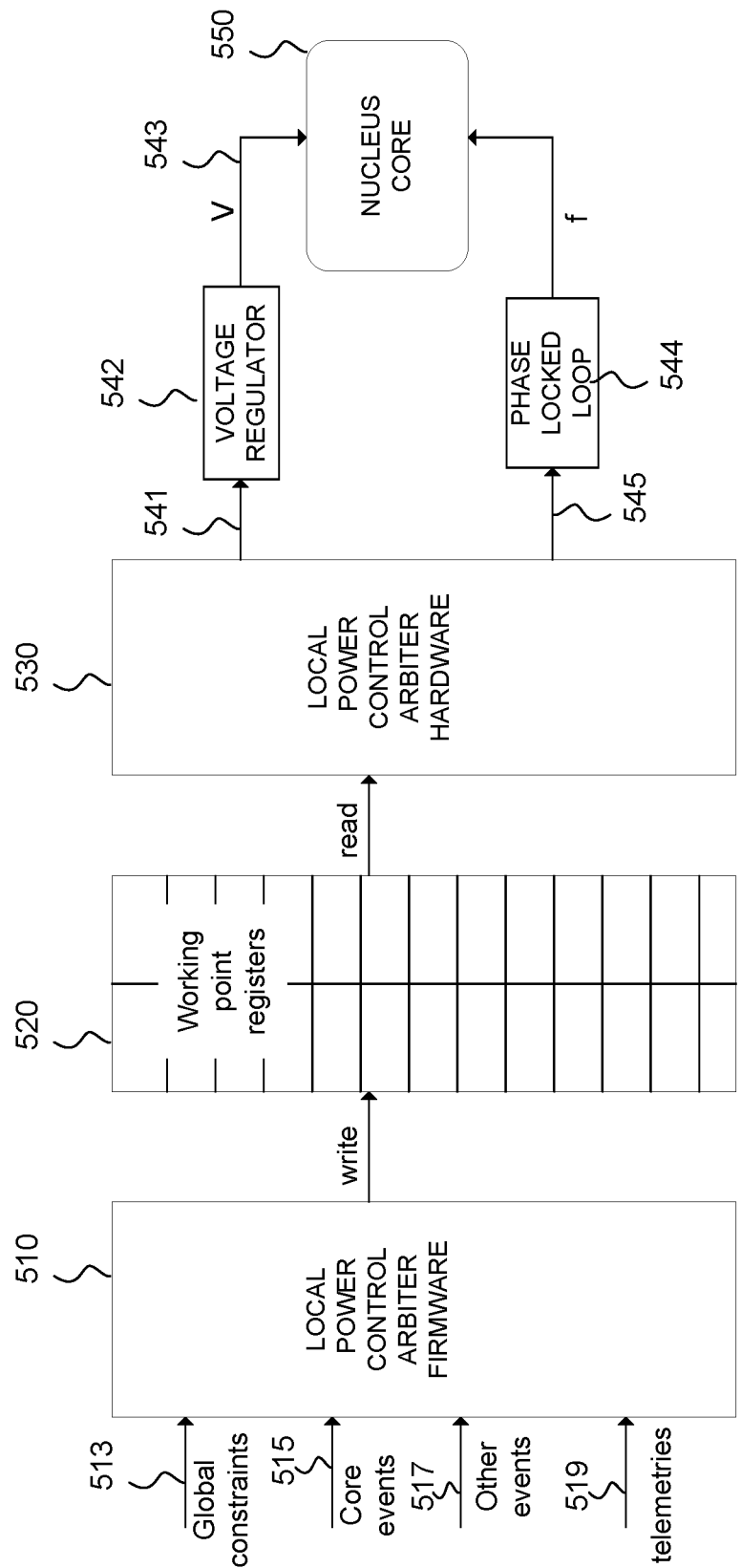
FIG. 5 schematically illustrates how performance level settings are applied to a processor core or other processing entity using local power control arbiter hardware and software.

FIG. 5 schematically illustrates how performance level settings are applied to a processor core (or other processing entity) using local power control arbiter hardware and software. The arrangement comprises: local power control firmware 510, as set of working point registers 520, local power control arbiter hardware 530, a fully integrated voltage regulator (FIVR) 542, a phase locked loop circuit 544 and a processor core 550. The local power control firmware 510 stores the "Lcode" to perform fine-grained performance level selection in cooperation with coarser grained (longer timescale an lower event resolution) performance level selection controlled by a global power control unit (not shown).

The local power control firmware 510 receives a number of inputs capable of influencing values written to the set of working point registers 520. In particular, in this embodiment, the inputs are a signal 513 corresponding to global power control unit constraints, a signal 515 corresponding to core events, a signal 517 corresponding to any other events and a signal 519 corresponding to telemetry is received either from the operating system or from the global power control unit. The local power control firmware 510 is arranged to write appropriate frequency and voltage values into the working point registers according to prevailing processing conditions determined locally. The work point may include frequency, voltage and reset type and has a mailbox structure. The values written to the working point registers 520 by the local power control firmware 510 are read by the local power control hardware 530, which implements the selected performance level values such as an operating frequency and a corresponding operating voltage by sending a first control signal 541 to the fully integrated voltage regulator 542 which in turn sends a signal 543 supplying an appropriate operating voltage to the processing core 550. In some embodiments processing conditions such as a level of utilization of the processing unit 410 are used to select from a predetermined set of frequency and voltage pairings appropriate for the processing unit 410 and accessible to the local power control arbiter 430. Similarly a second control signal 545 is supplied from the local power control hardware 532 the phase locked loop circuit 544 which sets an operating frequency of the processor core 550 via signal 547 output from the phase lock loop circuit 544 and input to to the processor core 550.

Thus it can be seen that according to embodiments, appropriate work points are selected based on restrictions, such as up an upper frequency limit from the global power control unit and also taking into account global factors, system state and any other processing events of the associated processing platform. The selected work points may be appropriately selected according to current processing conditions and based on finer grained event-tracking than in previously known systems that relied on global power control to directly set operating frequencies and voltages. The specially selected work points may be written to the hardware registers 520 enabling the power control arbiter hardware to apply an appropriate work point to the processor core 550 based on locally detected changes to processing conditions.

Provision of the Lcode in the local firmware 510 in this example allows events in a frequency range between 10 kHz and 100 kHz to be efficiently tracked whereas provision of the local power arbiter hardware 530 allows frequencies in the range from 100 kHz through to 1 MHz to be tracked. Alternative embodiments may track events in different frequency ranges. As shown in FIG. 3 (described above), these frequencies are higher frequencies than it would be possible to track using previously known global power control units although they are in a frequency range lower than the temporal resolution of events tracked by core program code ("u-code") and hardware of the processor core 550 itself.

Performance improvements derivable by using the finer grained event resolution possible with the local power control arbiter arrangement of the present technique include:
- an ability to detect locally when the core 550 is in an idle state and yet still set to operate at a high voltage and frequency allowing frequency reduction to be implemented to coincide with the short idle periods
- an ability to detect on finer timescale when the processing unit such as the core 550 has transitioned from running multiple threads to running a single thread space (which can result in 10 to 15% lower dynamic capacitance)
- an ability to more rapidly adapt to changes in dynamic capacitance to reduce an operating frequency and voltage and save power, where previously known systems might have fixed on voltage compensation for hundreds of microseconds as the timescale applicable to the global power control unit
- an ability to limit operation of the processor core 550 based on a value of ICC max whereas with only a global power control arbiter a worst case may be assumed to apply for a relatively long time which can result in the core being limited in frequency unnecessarily
- an ability to detect scenarios where processing throughput is not benefiting from a higher frequency setting such as scenarios where there is memory halt, spin loop and such like. Counters maintained by the local power control arbiter may be used for this.

FIG. 6 schematically illustrates how different work point limits and algorithms can be subdivided between a global power control unit 610 and a local power control arbiter 650. As illustrated in FIG. 6, the global power control unit in this embodiment controls a set of Gcode limits 612 comprising: three different power limits, "PL1", "PL2" and "PL3"; multi-core turbo parameters which differ depending on a number of active cores (hence global control retained); coarse grain scalability algorithms relating to event resolutions of greater than 100 μs but less than around 10 ms; responsiveness algorithms that monitor responsiveness metric such as a read latency during a write workload for a given operating frequency; and hardware controlled performance state (HWP) algorithms such as algorithms that allow a CPU to select its own stepping speed without using a CPU multiplier.

The first power limit "PL1" may correspond to an average power threshold not to be exceeded by the processing unit (e.g. a multi-core processor or a processor core or a GPU) but at which the processing unit could sustain power indefinitely; the second power limit "PL2" may be a power limit higher than PL1 corresponding to a power level that may be sustained by the processing unit for up to a first duration (for example, 100 seconds) and above which one or more power limiting algorithms attempt to limit power transients of the processing unit; the third power limit "PL3" may be higher than PL2 and may result in a power-reducing response of the processing unit to reactively limiting processing frequency to limit a duty cycle of transients above PL3.

Whilst the global power control unit 610 may controls three power limits, PL1, PL2 and PL3, the local power control arbiter may be delegated responsibility for a fourth power limit, "PL4" that may not be exceeded by the processing unit such that power-limiting algorithms may pre-emptively limit processing frequency to prevent spikes above this fourth power limit. Power transients may be permitted to peak at powers above PL2 and up to PL4 for up to a predetermined relatively short time (such as 10 ms for example) in comparison to the time (e.g. around 100 s) for which the processing unit may sustain power at power levels between PL1 and PL2.

A set of Lcode limits 652 comprises fine grain scalability algorithms, for example, those able to resolve event frequencies in an approximate range of between 10 khz (100 μs) and 1 Mhz (1 μs) and further comprises core specific turbo ratio limits (in contrast to the multi core turbo parameters under global control).

The Gcode limits 612 may include a record of core performance limit reasons for each core (or other processing unit) having a local arbiter and may also maintain a record f any global performance limit reasons. One core may request performance limit reasons for another core, for example, to allow at least part of a power allocation for one core to be reallocated to another core. Each Local Power control arbiter may maintain a control register with a bit for a local autonomous performance algorithm that it owns and a register indicating a frequency or other performance limit may maintain two current bits and also two log bits—one for each of the Turbo Ratio Limits and the ICCmax.

As illustrated in FIG. 6 a frequency upper limit value "F ceiling" may be calculated based on at least a subset of the Gcode limits 612 then output from the global power control unit 610 and suppled as input to the local power control arbiter 652. The local power control arbiter 650 may then perform fine grain scalability algorithms and implement core specific turbo ratio limits to determine an operating frequency request value that does not exceed the F ceiling value. The locally requested operating frequency may then be evaluated against the fourth power limit and the maximum permissible current ICCMAX and then selected and implemented by hardware in the core responsive to a signal 657 subject to the checks at block 654. A feedback signal 655 from the PL4 and ICCMAX local arbiter checks is returned to the global power control unit to provide a hint value to satisfy the frequency request.

FIG. 7A schematically illustrates a register layout in the global power control unit of an Local to Global (L2G) mailbox. The L2G mailbox comprises a total of three registers in this example embodiment including one 62-bit register and two 32 bit registers. A first 62-bit register is entitled IO_L2G_MAILBOX_IF and this comprises an eight bit command field, a 14 bit payload field, and 8-bit WINNING_CORE_ID field, a one bit CORE_BUSY field and a one bit RUN_BUSY field and a 32 bit data field occupying register bits [32:61]. A second register is a 32-bit register entitled IO_L2G_mailbox_data_low and a third register is a companion 32 bit register entitled IO_L2G_mailbox_data_high. The mailbox interface register, IO_L2G_MAILBOX_IF, together with IO_L2G_mailbox_data_low and IO_L2G_mailbox_data_high provide an interface from the local power control arbiter to the global power control unit. This L2G mailbox 424 (see FIG. 4) allows the Lcode to send commands to the Gcode. The Gcode writes command results on data registers and accesses these as control registers. The RUN_BUSY bit is reset by the Gcode and set by the Lcode. The L2G_mailbox_IF register is writable only by the Gcode if the RUN_BUSY bit is set whereas it is writable only by hardware the RUN_BUSY bit is cleared. Data is written to the L2G_mailbox_data_low and L2G_mailbox_data_high registers. The CORE_BUSY and WINNING_CORE_ID fields may be used to indicate which of a plurality of processing entities, such as a plurality of processing cores, currently has control of the L2G mailbox. Any write operation attempted by core other than the current controlling core denoted the "WINNING_CORE" is ignored by the mailbox interface. Thus the L2G mailbox serves only a single core at any given time. Thus a given L court should keep retrying until it gets WINNING_CORE_ID==my core ID.

FIG. 7B schematically illustrates a global power control unit to local power control arbiter mailbox or G2L mailbox 464 (see FIG. 4. The G2L mailbox has a 32-bit G2L_MAILBOX_INTERFACE and also a 32-bit G2L_mailbox_data_low register and a 32-bit G2L_mailbox_data_high register. The G2L_MAILBOX_INTERFACE register in this example has an 8-bit command field, a 14-bit payload field a 9-bit reserved (RSVD) field and a one-bit RUN_BUSY field. The three 32-bit registers of the G2L mailbox 464 allow the Gcode to send commands to the Lcode of a given core. The RUN_BUSY bit is set by the Gcode and cleared by the Lcode. The register is writable only by Lcode if the RUN_BUSY bit is set but is writable only by hardware if a RUN_BUSY bit is cleared.

Figure 8:
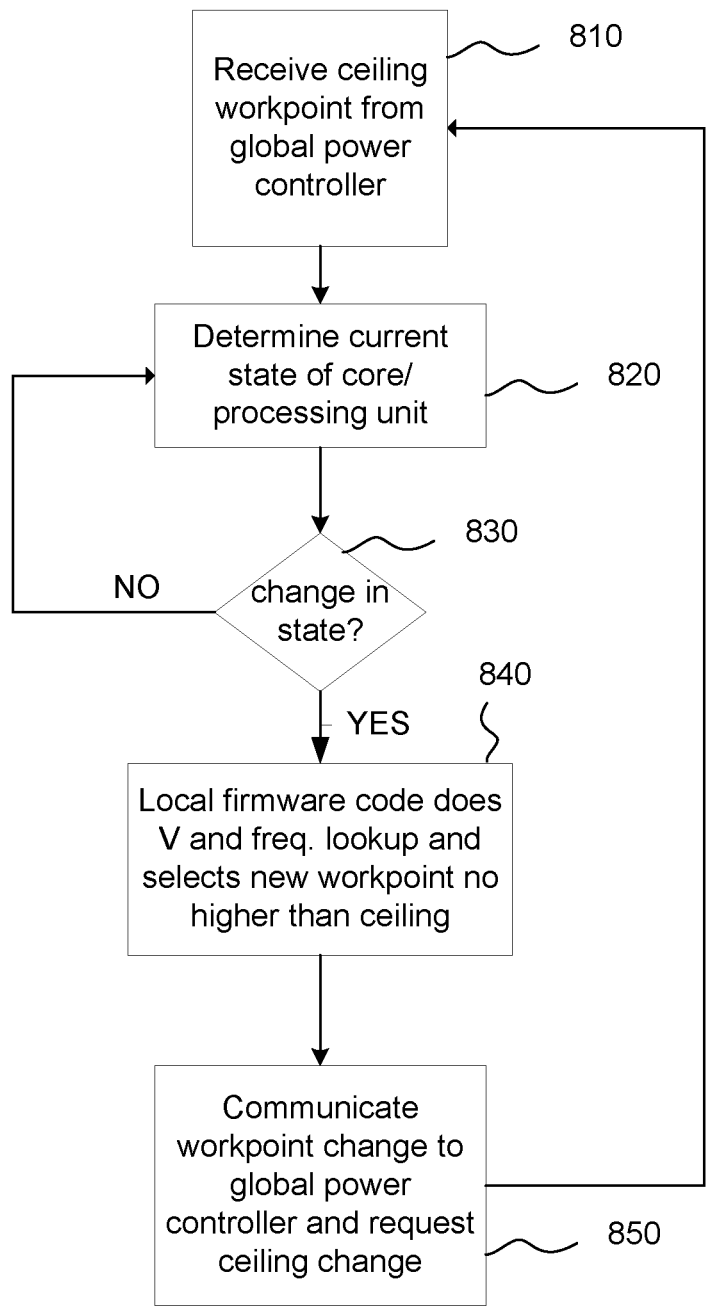
FIG. 8 is a flowchart schematically illustrating how a performance level work point is cooperatively set using the global power control unit and a local power control arbiter.

FIG. 8 is a flowchart schematically illustrating how a performance level work point is cooperatively set using the global power control unit and the local power control arbiter according to the present technique. At block 810 the local power control arbiter receives a power limit such as a ceiling work point (e.g. a frequency upper limit) from the global power control unit. At block 820 the local power control arbiter determines a current state of the processing core (or other local processing entity) to perform fine-grained control of a performance level of the local processing entity constrained by the ceiling work point. At block 830 if it is determined that is there is no change of state on the relevant timescale, then the process flow is directed back to block 820.

Alternatively, if it is determined that there is in fact a change in state warranting an increase or decrease in operating frequency, then the process proceeds to block 840 where Lcode does a frequency and voltage lookup in a set of work point registers to select a new work point appropriate for a current time. At this point different factors may be taken into account in selecting the operating frequency and voltage, such as whether the instruction workload is heavy or light and/or whether a single thread or multiple threads are currently executing on the local core. Once the work point change has been selected and implemented at block 840, the change in work point is communicated to the global power control unit at block 850 and this may feedback into a request for a frequency ceiling change by the global power control unit. Thus after block 850 the process returns to block 810.

Figure 9:
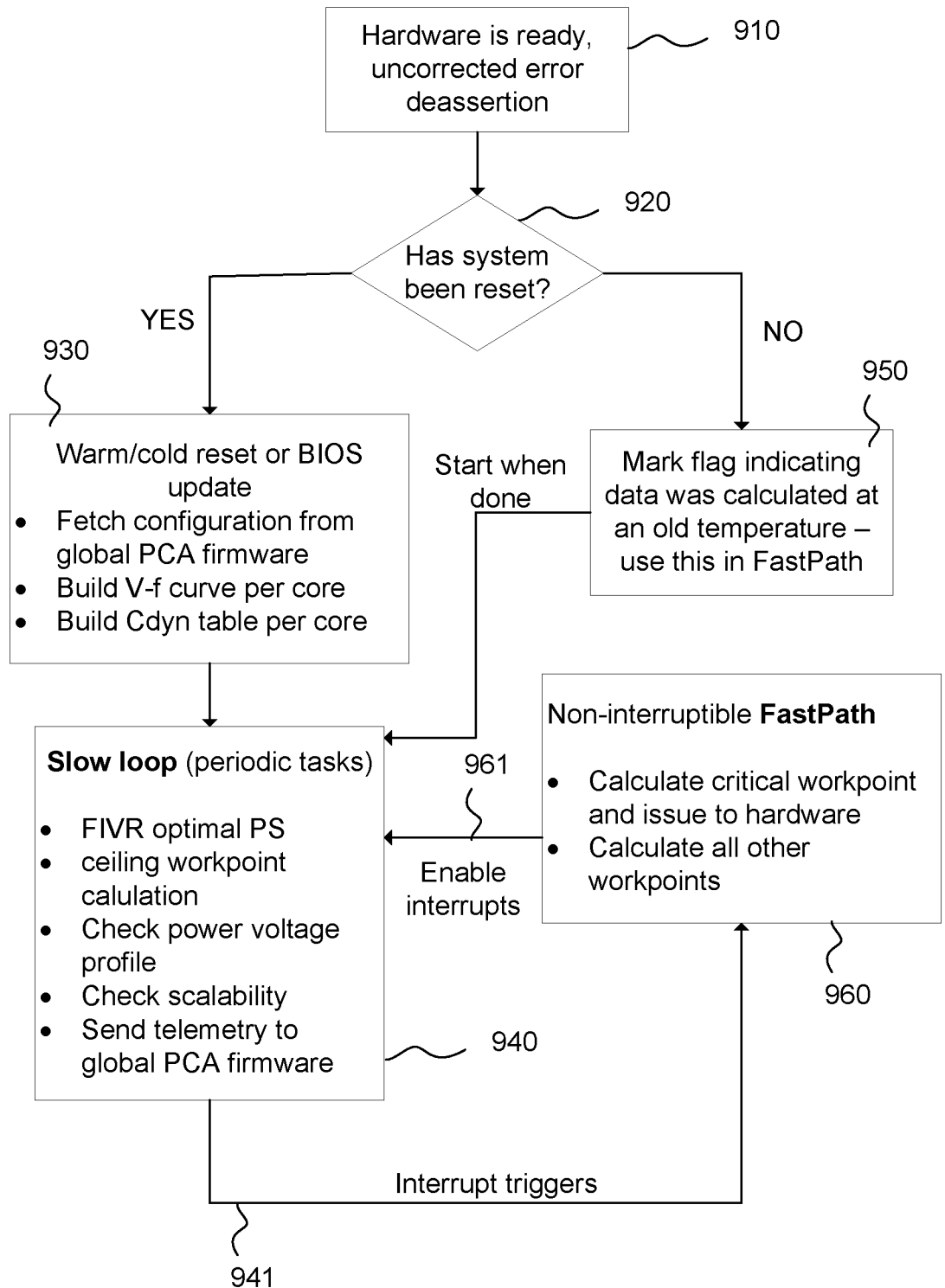
FIG. 9 is a flowchart schematically illustrating a high level flow describing functionality of the local power control arbiter.

FIG. 9 is a flowchart schematically illustrating a high level flow describing functionality of the local power control arbiter and the global power controller. At block 910 a check is performed to determine whether or not local hardware is ready corresponding to an uncorrected error reset signal deassertion. Next at block 920 it is determined whether or not the system has been reset. If at block 920 it is determined that the system has in fact been reset, then the process proceeds to block 930 where a reboot is performed by fetching certain data from the operating system basic input output system (BIOS). In particular, a configuration is fetched from the global power control unit firmware, voltage-frequency curves are built up per core of the processing platform and a dynamic capacitance table is built up per core. Next, once the configuration data and tables have been populated at block 930, the process proceeds to a "slow loop" (periodic tasks) block 940 comprising determining a fully integrated voltage regulator power setting, performing a ceiling work point calculation (by the Gcode), checking a power voltage profile, checking a fine-grained scalability and sending telemetry from the local power control arbiter to the global power control firmware.

If instead of determining the system has been reset at block 920, it is determined that there has been no system reset then the process proceeds from block 922 block 950. At block 950, a flag is set indicating that the current data was calculated at an old temperature and this is used in a fast path calculation allowing the configuration-fetching, dynamic capacitance building and voltage frequency curve building of block 930 to be bypassed to move directly to the slow loop periodic tasks of block 940. The relevance of the temperature is that a voltage appropriate for a given frequency changes with temperature because transistor speed can vary with temperature.

The Lcode in this example is interrupt driven as shown by an interrupt triggers signal 941 that is directed from the slow the periodic tasks block 942 a non-interruptible fast path process block 960. The fast path process block 960 involves calculating a critical work point and issuing the work point to hardware and calculating all other work points. The critical work point may relate to conditions that a core runs on such as instruction set architecture instruction or some other special instruction. An enable interrupt signal 961 is provided between the fast path process block 960 and directed to the slow the process block 940. The enable interrupt signal causes the Lcode to suspend and to switch to the critical task. Interrupt triggers 941 are sent from the slow loop 940 to the fast path block 960. If there is no critical work to be performed then the Lcode may be permitted to perform some maintenance tasks whereas the interrupt triggers 941 change the focus to more critical tasks.

In some example embodiments it may be possible to deactivate the autonomous work point selection performed locally to revert to a scheme whereby the global power control unit controls and triggers work point changes in frequency and voltage. This deactivation may allow a specific integrated circuit such as a SOC to selectively activate or deactivate one or more features of the local performance level control. However, when the autonomous work point selection feature is enabled, the Gcode may issue a work point change with a frequency ceiling and a voltage ceiling on the same interface with the Lcode being delegated responsibility for determining the actual work point. The frequency ceiling may comprise a frequency upper limit. This may include a multi core turbo, thermal throttling, energy limit control, scalability and responsiveness algorithms. A voltage ceiling may comprise a voltage upper limit and this may include maximum voltage fuses and any constraints from dynamic voltage management. The voltage ceiling and frequency ceiling may be configured as a permissible work points. The fine-grained work point determination according to the present technique be may be enabled or disabled using, for example a bit in the capability that or a configuration bit. It may be useful to deactivate the autonomous local control of the work point and to reactivate global setting of processing unit work points, for example, if the Lcode is determined to be faulty, in which case it can be conveniently deactivated.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware.

Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machine-readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following examples pertain to further embodiments.

Example 1 is a local power control arbiter to interface with a global power control unit of a processing platform having a plurality of processing entities, the local power control arbiter to control a local processing unit of the processing platform, the local power arbiter comprising:
  an interface to receive from the global power control unit, a local performance limit allocated to the local processing unit depending on a global power control evaluation; and
  processing circuitry to:
  determine any change to one or more processing conditions prevailing in the local processing unit on a timescale shorter than a duration for which the local performance limit is applied to the local processing unit by the global power control unit; and
  select a performance level for the local processing unit depending on both the local performance limit and the determined change, if any, to the prevailing processing conditions on the local processing unit.

Example 2. Local power control arbiter of example 1, wherein the local performance limit comprises at least one of: a frequency upper limit, a voltage upper limit, a power upper limit and a current upper limit.

Example 3. Local power control arbiter of example 1 or example 2, wherein the duration for which the local performance limit is applied to the local processing unit by the global power control unit is greater than 100 microseconds whereas a timescale within which any change to the processing conditions is determined is in a range of between 10 micro seconds and 100 microseconds.

Example 4. Local power control arbiter of any one of examples 1 to 3, wherein the determined change in processing conditions comprises at least one of: a change in a number of threads executing on the processing unit, a change in a processing workload and a change in utilization of the processing unit.

Example 5. Local power control arbiter of any one of examples 1 to 4, arranged to receive from the local processing unit a request to change a performance level of the local processing unit and to relay the performance level change request to the global power control unit for a subsequent global power evaluation to update the local performance limit.

Example 6. Local power control arbiter of any one of examples 1 to 5, wherein the local power control arbiter is to manage at least one of: a threshold power for at least one processing entity of the local processing unit; a threshold current for at least one processing entity of the local processing unit; one or more turbo ratio limits for at least one processing entity of the local processing unit and a scalability of a processing workload executing on at least one processing entity of the local processing unit.

Example 7. Local power control arbiter of any one of examples 1 to 6, comprising a work point arbiter to arbitrate between the local performance limit determined by the global power control unit and a local power constraint requested by the local power control unit.

Example 8. Local power control arbiter of example 7, wherein the work point arbiter is to select between a plurality of different local performance levels for one or more processing entities of the local processing unit within the constraint of the local performance limit.

Example 9. Local power control arbiter as in example 8, wherein the local performance levels are selected based on predetermined values stored in a set of registers.

Example 10. Local power control arbiter of any one of examples 1 to 9 comprising a microprocessor, a non-volatile memory and an input/output interface.

Example 11. Local power control arbiter of examples 1 to 10, wherein the local processing unit comprises one of: a processor core, a graphics processing unit and an image processing unit.

Example 12. Local power control arbiter of any one of examples 1 to 11, comprising a global to local mailbox having one or more hardware registers to send commands from the global power control unit to the local power control arbiter.

Example 13. Local power control arbiter of example 12, wherein the global to local mailbox has a register field to allow selection of one of a plurality of processing units to receive commands from the global power control unit.

Example 14. Local power control arbiter of any one of examples 1 to 13, comprising a local to global mailbox having one or more hardware registers to enable the local power control arbiter to send commands to the global power control unit.

Example 15. Local power control arbiter of example 14, wherein the local to global mailbox comprises a register field to identify which one, if any, of the plurality of processing entities of the processing platform currently has control of the local to global mailbox.

Example 16. Local power control arbiter of example 15, wherein the local to global mailbox comprises a register filed to disable any write attempt to the local to global mailbox from a processing entity other than the currently controlling processing entity.

Example 17. Local power control arbiter of example 16, configured to load configuration data for from a basic input output system, BIOS, of an operating system of the processing platform during a reset operation.

Example 18 is a processing platform comprising:
  a plurality of processing entities;
  a global power control unit to control a performance level of the plurality of processing entities; and
  at least one local power control arbiter as in any one of examples 1 to 17;

wherein at least one subset of the plurality of processing entities is controlled by a respective local power control arbiter.

Example 19. The processing platform as in example 18, comprising a plurality of local power control arbiters to control a respective plurality of processing units of the processing platform, each processing unit having at least one processor core.

Example 20 is an integrated circuit comprising the processing platform of example 18 or example 19.

Example 21. Machine readable instructions provided on a transitory or non-transitory machine readable medium, the machine readable instructions upon execution by one or more processors of a local power control arbiter to:
receive from a global power control unit of a processing platform, a local performance limit allocated to a local processing unit of the processing platform depending on a global power control evaluation;
determine any change to one or more processing conditions prevailing in the local processing unit on a timescale shorter than a duration for which the local performance limit is applied to the local processing unit by the global power control unit; and
select a performance level for the local processing unit depending on both the local performance limit and the determined change, if any, to the prevailing processing conditions on the local processing unit.

Example 22. Machine readable instructions as in example 21, wherein the local performance limit comprises a frequency upper limit for the processing unit and wherein the frequency upper limit applies to one or more processor cores of the processing unit.

Example 23. A method of controlling a performance level of a local processing unit of a processing platform comprising a global power control unit, the method comprising:
receiving from the global power control unit, a local performance limit allocated to the local processing unit of the processing platform depending on a global power control evaluation;
determining any change to one or more processing conditions prevailing in the local processing unit on a timescale shorter than a duration for which the local performance limit is applied to the local processing unit by the global power control unit; and
selecting a performance level for the local processing unit depending on both the local performance limit and the determined change, if any, to the prevailing processing conditions on the local processing unit.

Example 24. The method of example 23, comprising receiving from the local processing unit a request for a change to a performance level of the processing unit and relaying the request to the global power control unit to update the local performance limit.

The invention claimed is:

1. An apparatus of a local power control arbiter to interface with a global power control unit of a processing platform having a plurality of processing entities, the apparatus including the local power control arbiter to control a local processing unit of the processing platform, the apparatus comprising:
an interface to receive, from the global power control unit, a local performance limit allocated to the local processing unit depending on a global power control evaluation;
a local to global mailbox having one or more hardware registers to enable the local power control arbiter to send commands to the global power control unit, wherein the local to global mailbox comprises:
a first register field to identify which one of the plurality of processing entities of the processing platform currently has control of the local to global mailbox; and
a second register field to disable any write attempt to the local to global mailbox from a processing entity other than the currently controlling processing entity; and
processing circuitry to:
determine any change to one or more processing conditions prevailing in the local processing unit on a timescale shorter than a duration for which the local performance limit is applied to the local processing unit by the global power control unit; and
configure a performance level for the local processing unit depending on both the local performance limit and the determined change to the prevailing processing conditions on the local processing unit.

2. The apparatus of claim 1, wherein the local performance limit comprises at least one of: a frequency upper limit, a voltage upper limit, a power upper limit, and a current upper limit.

3. The apparatus of claim 1, wherein the duration for which the local performance limit is applied to the local processing unit by the global power control unit is greater than 100 microseconds whereas a timescale within which any change to the processing conditions is determined is in a range of between 10 micro seconds and 100 microseconds.

4. The apparatus of claim 1, wherein the determined change in processing conditions comprises at least one of: a change in a number of threads executing on the processing unit, a change in a processing workload, and a change in utilization of the processing unit.

5. The apparatus of claim 1, wherein the processing circuitry is to receive, from the local processing unit, a request to change a performance level of the local processing unit and to relay the performance level change request to the global power control unit for a subsequent global power evaluation to update the local performance limit.

6. The apparatus of claim 1, wherein the local power control arbiter is to manage at least one of:
a threshold power for at least one processing entity of the local processing unit; a threshold current for at least one processing entity of the local processing unit;
one or more turbo ratio limits for at least one processing entity of the local processing unit; and
a scalability of a processing workload executing on at least one processing entity of the local processing unit.

7. The apparatus of claim 1, comprising a work point arbiter to arbitrate between the local performance limit determined by the global power control unit and a local power constraint requested by the local processing unit.

8. The apparatus of claim 7, wherein the work point arbiter is to select between a plurality of different local performance levels for one or more processing entities of the local processing unit within the constraint of the local performance limit.

9. The apparatus of claim 8, wherein the local performance levels are selected based on predetermined values stored in a set of registers.

10. The apparatus of claim 1, comprising a microprocessor, a non-volatile memory, and an input/output interface.

11. The apparatus of claim 1, wherein the local processing unit comprises one of: a processor core, a graphics processing unit and an image processing unit.

12. The apparatus of claim 1, comprising a global to local mailbox having one or more hardware registers to send commands from the global power control unit to the local power control arbiter.

13. The apparatus of claim 12, wherein the global to local mailbox has a register field to allow selection of one of a plurality of processing units to receive commands from the global power control unit.

14. The apparatus of claim 1, wherein the processing circuitry is to load configuration data for from a basic input output system, BIOS, of an operating system of the processing platform during a reset operation.

15. A processing platform comprising:
a plurality of processing entities;
a global power control unit to control a performance level of the plurality of processing entities; and
at least one local power control arbiter that includes:
an interface to receive, from the global power control unit, a local performance limit allocated to the local processing unit depending on a global power control evaluation;
a local to global mailbox having one or more hardware registers to enable the local power control arbiter to send commands to the global power control unit, wherein the local to global mailbox comprises:
a first register field to identify which one of the plurality of processing entities of the processing platform currently has control of the local to global mailbox; and
a second register field to disable any write attempt to the local to global mailbox from a processing entity other than the currently controlling processing entity; and
processing circuitry to:
determine any change to one or more processing conditions prevailing in the local processing unit on a timescale shorter than a duration for which the local performance limit is applied to the local processing unit by the global power control unit; and
configure a performance level for the local processing unit depending on both the local performance limit and the determined change to the prevailing processing conditions on the local processing unit, wherein at least one subset of the plurality of processing entities is controlled by a respective local power control arbiter.

16. The processing platform as claimed in claim 15, comprising a plurality of local power control arbiters to control a respective plurality of processing units of the processing platform, each processing unit having at least one processor core.

17. The processing platform as claimed in claim 15, wherein the processing platform is included in an integrated circuit.

18. Machine readable instructions provided on a non-transitory machine-readable medium that, when executed by one or more processors of a local power control arbiter are to:
receive, from a global power control unit of a processing platform, a local performance limit allocated to a local processing unit of the processing platform depending on a global power control evaluation;
provide a local to global mailbox having one or more registers to enable the local power control arbiter to send commands to the global power control unit, wherein the local to global mailbox comprises:
a first register field to identify which one of the plurality of processing entities of the processing platform currently has control of the local to global mailbox; and
a second register field to disable any write attempt to the local to global mailbox from a processing entity other than the currently controlling processing entity;
determine any change to one or more processing conditions prevailing in the local processing unit on a timescale shorter than a duration for which the local performance limit is applied to the local processing unit by the global power control unit; and
configure a performance level for the local processing unit depending on both the local performance limit and the determined change to the prevailing processing conditions on the local processing unit.

19. Machine readable instructions as claimed in claim 18, wherein the local performance limit comprises a frequency upper limit for the processing unit and wherein the frequency upper limit applies to one or more processor cores of the processing unit.

20. A method of controlling a performance level of a local processing unit of a processing platform comprising a global power control unit, the method comprising:
receiving from the global power control unit, a local performance limit allocated to the local processing unit of the processing platform depending on a global power control evaluation;
providing a local to global mailbox having one or more registers to enable a local power control arbiter to send commands to the global power control unit, wherein the local to global mailbox comprises:
a first register field to identify which one of the plurality of processing entities of the processing platform currently has control of the local to global mailbox; and
a second register field to disable any write attempt to the local to global mailbox from a processing entity other than the currently controlling processing entity;
determining any change to one or more processing conditions prevailing in the local processing unit on a timescale shorter than a duration for which the local performance limit is applied to the local processing unit by the global power control unit; and
configuring a performance level for the local processing unit depending on both the local performance limit and the determined change to the prevailing processing conditions on the local processing unit.

21. The method of claim 20, comprising receiving from the local processing unit a request for a change to a performance level of the processing unit and relaying the request to the global power control unit to update the local performance limit.

* * * * *